(12) United States Patent
Rodriguez-Natal et al.

(10) Patent No.: US 12,719,757 B2
(45) Date of Patent: Aug. 25, 2026

(54) APPLICATION MONITORING SYSTEM FOR NETWORK ORCHESTRATION

(71) Applicant: Cisco Technology, Inc., San Jose, CA (US)

(72) Inventors: Alberto Rodriguez-Natal, Leon (ES); Saswat Praharaj, Pleasanton, CA (US); Lorand Jakab, Gheorghieni (ES); Fabio R. Maino, Palo Alto, CA (US); Pradeep Kumar Kathail, Los Altos, CA (US); Vivek Agarwal, Campbell, CA (US); Ram Dular Singh, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 261 days.

(21) Appl. No.: 18/591,960

(22) Filed: Feb. 29, 2024

(65) Prior Publication Data

US 2024/0205094 A1 Jun. 20, 2024

Related U.S. Application Data

(63) Continuation-in-part of application No. 17/890,756, filed on Aug. 18, 2022, now Pat. No. 12,155,556.

(Continued)

(51) Int. Cl.
*H04L 41/12* (2022.01)

(52) U.S. Cl.
CPC .................................... *H04L 41/12* (2013.01)

(58) Field of Classification Search
CPC ....... H04L 41/12; H04L 67/51; H04L 45/306; H04L 45/42; H04L 45/64; H04L 67/10;

(Continued)

(56) References Cited

U.S. PATENT DOCUMENTS

| | | | | |
|---|---|---|---|---|
| 10,917,331 | B1 * | 2/2021 | Zaki | H04L 43/028 |
| 10,944,691 | B1 | 3/2021 | Raut et al. | |

(Continued)

FOREIGN PATENT DOCUMENTS

| | | | | |
|---|---|---|---|---|
| EP | 3799371 A1 * | 3/2021 | | H04L 45/48 |

OTHER PUBLICATIONS

Office Action for U.S. Appl. No. 17/890,756, mailed on Jul. 27, 2023, Alberto Rodriguez Natal, "Egress Traffic Optimization", 25 pages.

(Continued)

*Primary Examiner* — Javier O Guzman
(74) *Attorney, Agent, or Firm* — Lee & Hayes, P.C.

(57) ABSTRACT

An application monitoring system for collecting, utilizing, and/or exchanging state information (e.g., application state and network state), configuration information, and/or other information to make network optimizations for applications orchestrated by an application orchestration system. The application monitoring system may include an application orchestrator discovery component that is configured to determine a presence of an application orchestration system for orchestrating applications. The application monitoring system may also include one or more application watch components for monitoring, among other things, application state, application configuration, and/or application replicas. The application monitoring system may further include a network state propagation component configured to provide network state information to the orchestration system.

20 Claims, 7 Drawing Sheets

Related U.S. Application Data

(60) Provisional application No. 63/320,768, filed on Mar. 17, 2022.

(58) Field of Classification Search
CPC ... G06F 2009/4557; G06F 2009/45595; G06F 9/45558
See application file for complete search history.

(56) References Cited

U.S. PATENT DOCUMENTS

| | | | | |
|---|---|---|---|---|
| 12,210,898 | B1 * | 1/2025 | Kapoor | G06F 16/27 |
| 2004/0228323 | A1 * | 11/2004 | Acharya | H04L 45/00 370/255 |
| 2016/0164826 | A1 | 6/2016 | Riedel | |
| 2017/0026417 | A1 | 1/2017 | Ermagan et al. | |
| 2017/0063667 | A1 * | 3/2017 | Maskalik | H04L 43/0852 |
| 2020/0067831 | A1 * | 2/2020 | Spraggins | H04L 41/5009 |
| 2020/0177503 | A1 * | 6/2020 | Hooda | H04L 12/4641 |
| 2020/0259750 | A1 | 8/2020 | Iyer et al. | |
| 2020/0322262 | A1 * | 10/2020 | Maino | H04L 45/64 |
| 2021/0019194 | A1 * | 1/2021 | Bahl | H04L 67/1031 |
| 2021/0218652 | A1 * | 7/2021 | Raut | H04L 43/20 |
| 2021/0234801 | A1 * | 7/2021 | Sidebottom | H04L 45/02 |
| 2021/0266262 | A1 | 8/2021 | Subramanian et al. | |
| 2021/0328913 | A1 | 10/2021 | Nainar et al. | |
| 2022/0029921 | A1 | 1/2022 | Rodriguez-Natal et al. | |
| 2022/0407816 | A1 * | 12/2022 | G | H04L 47/781 |
| 2022/0417147 | A1 * | 12/2022 | Woodworth | H04L 45/08 |
| 2023/0198843 | A1 * | 6/2023 | Lifshitz | H04L 41/0873 709/220 |
| 2023/0300059 | A1 | 9/2023 | Natal | |

OTHER PUBLICATIONS

PCT Search Report and Written Opinion Mailed on May 23, 2023, for PCT Application No. PCT/US23/014586, pp. # 18.

Serracanta, et al, "Wide Area Network Autoscaling for Cloud Application", Proceedings of the 3rd Workshop on Cyber Security Arms Race, ACMPUB27, New York, NY, USA, pp #1-#6.

* cited by examiner

APPLICATION MONITORING SYSTEM FOR NETWORK ORCHESTRATION

RELATED APPLICATIONS

This application is a continuation in part of, and claims priority to, U.S. patent application Ser. No. 17/890,756, filed on Aug. 18, 2022, which claims priority to U.S. Provisional Application No. 63/320,768, filed on Mar. 17, 2022. The entire contents of the above listed documents are incorporated herein by reference in their entirety and for all purposes.

TECHNICAL FIELD

The present disclosure relates generally to, among other things, techniques for passing application state, configuration, and/or other information between an application orchestration system and a network orchestrator, thereby enabling the network orchestrator to make network-related optimizations for traffic associated with the application orchestration system.

BACKGROUND

Modern, distributed applications require efficient network connectivity. However, it is becoming more challenging for network operations teams to adequately understand the needs of these composable microservice applications. Moreover, tackling the dynamic nature of these applications poses an additional challenge since their requirements can quickly change over time. For examples, today's applications typically have dependencies on external components and services, which usually means that there are egress traffic flows from these application to these remote services. Previously, these external dependencies/flows were somewhat undocumented, yet, more and more often these external dependencies and egress flows are clearly defined as part of the application infrastructure configuration. However, these egress configurations are mostly in place today to define security policies, such as allowing/denying connections from local applications to remote services.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
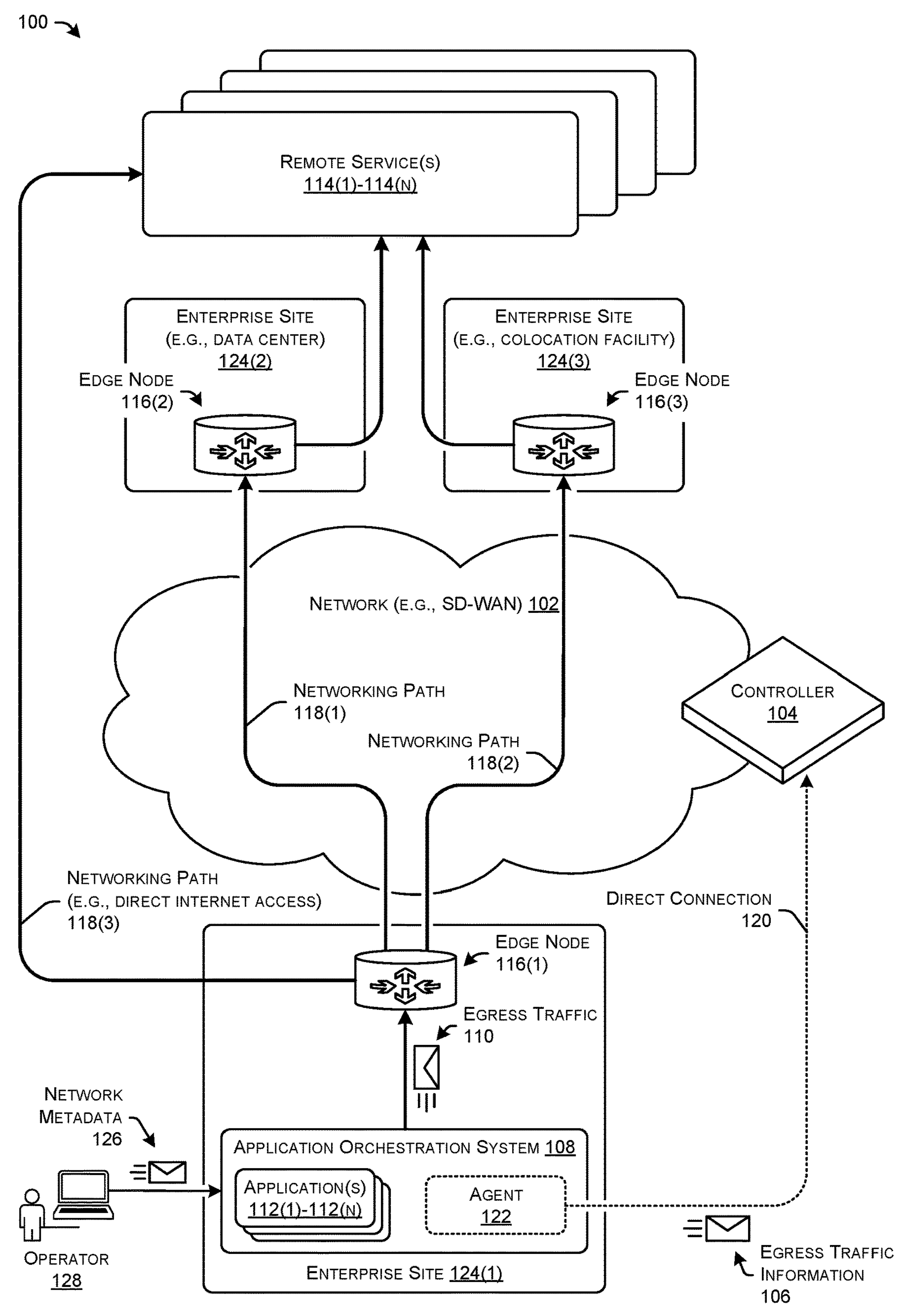
FIG. 1 illustrates an example architecture that may implement various aspects of the technologies described herein.

This disclosure describes various technologies for passing application state, configuration, and/or other information between an application orchestration system and a network orchestrator, thereby enabling the network orchestrator to make network-related traffic optimizations. By way of example, and not limitation, the techniques described herein may include determining a presence of an orchestration system for orchestrating applications. The techniques may also include obtaining, from the orchestration system, configuration data associated with an application hosted by the orchestration system. In some examples, state information associated with the application may also be obtained from the orchestration system. The techniques may also include providing, to the network orchestrator, the configuration data and the state information, the network orchestrator configured to render a network optimization for traffic of the application based on the configuration data and the state information. In some examples, the techniques may include providing, to the orchestration system, network state information associated with the network optimization.

Additionally, the techniques described herein may be performed as a method and/or by a system having non-transitory computer-readable media storing computer-executable instructions that, when executed by one or more processors, performs the techniques described above.

Example Embodiments

As discussed above, today's applications typically have dependencies on external components and services, which usually means that there are egress traffic flows from these application to these remote services. Previously, these external dependencies/flows were somewhat undocumented, yet, more and more often these external dependencies and egress flows are clearly defined as part of the application infrastructure configuration. However, these egress configurations are mostly in place today to define security policies, such as allowing/denying connections from local applications to remote services.

Interestingly, the detailed info provided in these egress configurations (e.g., destination hostname, ports, etc.) could be enough to not only make security policy decisions (e.g., allow/deny traffic), but to also optimize the traffic at the network level. Therefore, there is a missing optimization opportunity to consume the already available egress traffic information to perform network optimization between the application infrastructure and the remote services.

This application describes, among other things, systems and methods for automating traffic optimizations for egress traffic of an application orchestration system (e.g., Kubernetes) that is being sent over a network (e.g., a software-defined wide area network (SD-WAN)) to one or more remote service(s). As used herein, a "network" may include any type of network that is, in some instances, capable of performing one or more "SaaS optimization" techniques, such as: (i) establishing different networking paths from a given application orchestration infrastructure to a remote service (e.g., a software as a service (SaaS) application) that an application is consuming; (ii) monitoring and/or probing the different networking paths over time to determine which path is the best way for the application (or the orchestration system, generally) to reach the remote service; and/or (iii) dynamically selecting a specific networking path to steer the application egress traffic through. In some examples, such a network may be a software-defined wide area network (SD-WAN), a wide area network (WAN), or any other type of network that may be disposed between an application orchestration system and one or more remote services.

Additionally, an "application orchestration system" as used herein may be any type of application orchestration system or container orchestration platform (e.g., Kubernetes, Docker Swarm, Apache Mesos, etc.) that is capable of explicitly defining configuration for application egress traffic. In some examples, this defined configuration may be a part of the general configuration of the application orchestration system itself (e.g., part of some network policies in Kubernetes), can be an ad-hoc configuration in place to handle egress traffic (e.g., in-house solutions), can be part of a component running on the application orchestration system that is capable of handling the egress traffic (e.g., a service mesh, such as Istio, where explicit egress policies can be defined), and/or the like.

In some examples, the technologies disclosed herein may include a component or other mechanism that is capable of automatically extracting an egress traffic definition (e.g., destination IP address, port, network 5-tuple, hostname, URL, etc.) from an egress configuration on the application orchestration system, and make that information available to network infrastructure or a controller of the network (e.g., SDN controller, SD-WAN controller, etc.) so that the egress traffic definition can be used to establish, monitor, and/or select different paths for the egress traffic to traverse towards the remote services. In one example, an agent (e.g., SD-WAN agent, Kubernetes controller or operator, etc.) may be ran on the infrastructure of the application orchestration system, and the agent may monitor and/or retrieve egress information data and pass it on to the network controller. Additionally, or alternatively, in some examples the network controller may directly connect with the application orchestration system and retrieve the egress information itself. In some examples, the egress information data may be retrieved from an external database, a service registry, or the like where this information may be stored.

Additionally, in some examples, the technologies of this disclosure may include a mechanism that is capable of associating network metadata with the egress configuration of the application orchestration system to define which egress configurations should be consumed by the network. Additionally, in some instances, the mechanism may be capable of associating explicit network policies with the application egress configuration. As such, associating the network metadata with the egress configuration allows for establishing egress optimizations for at least a portion of flows (e.g., flows towards certain remote services), as well as to define fine grain optimizations to be applied to the egress traffic. In some examples, techniques for associating metadata to the egress definition can be done in multiple ways. For example, in the application orchestration system (or a service mesh running on it), "annotations" may be defined as part of the existing configuration for egress policies. Additionally, or alternatively, any other way to convey configurations in an application orchestration system (e.g., configuration maps) may be defined to specify this information. In such examples, the annotations and/or different configuration files could be read by the agent deployed in the application orchestration system or by the network controller directly. It should be appreciated that using annotations and different configuration files are just examples of how this network metadata could be associated with the egress configuration, and that other options are also possible, such as custom resource definitions (CRDs), labels, etc.

By way of example, and not limitation, a method according to the techniques described herein may include receiving data indicating an egress traffic definition associated with egress traffic of an application orchestration system that is to be sent to a remote service (e.g., software as a service (SaaS), application programming interface (API), Storage, Database, Middleware, Monolithic service, etc.). In some examples, the egress traffic definition may include, among other things, a destination internet protocol (IP) address associated with the remote service, a destination port associated with the remote service, a network 5-tuple associated with the egress traffic, a hostname or domain name associated with the service, URL associated with the service, and/or the like. In some examples, one or more applications that are hosted on the application orchestration system, or the application orchestration system itself, may have external dependencies or external components that they rely upon the remote service to perform. In some examples, the egress traffic definition may be stored in an egress configuration (e.g., configuration file) associated with the application orchestration system or an application scope (e.g., namespace).

In examples, the egress traffic definition may be received by a controller of a network (e.g., a SDN controller of an SD-WAN). In some examples, how the egress traffic definition is received by the controller may vary from case to case based on specific implementations. For instance, as one example, the egress traffic definition may be received from an agent that is running on resources of the application orchestration system. In examples, the agent may be configured to monitor and/or retrieve egress traffic definition data on behalf of the controller, as well as configured to forward the egress traffic definition(s) on to the controller. As an additional, or alternative, example, the egress traffic definition(s) may be received by the controller via a direct connection with the application orchestration system. For instance, the controller may establish a direct connection with the application orchestration system and obtain, via the direct connection, the egress traffic definition from the egress traffic configuration of the application orchestration system. In some examples, the egress traffic definition(s) may be obtained or otherwise received from an external database, a service registry, or the like where this information may be stored.

In some examples, the method may also include determining, based at least in part on the egress traffic definition, a networking path that is optimized for sending the egress traffic to the remote service. For instance, the controller may determine the networking path that is optimized for sending the egress traffic to the remote service(s). In some examples, the controller may be capable of performing one or more "SaaS optimization" techniques on behalf of the network, such as: (i) establishing different networking paths from the application orchestration system to the remote service that an application may be consuming; (ii) monitoring and/or probing the different networking paths over time to determine which path is the best way for the application (or the orchestration system, generally) to reach the remote service (s); and/or (iii) dynamically selecting a specific networking path to steer the application egress traffic through.

In some examples, the networking path that is optimized for sending the egress traffic to the remote service may be a networking path that traverses through a fabric of the network. That is, the egress traffic may be forwarded or otherwise routed through one or more nodes of the network fabric. In another example, the networking path may be a direct internet access path that bypasses the fabric of the network.

In some examples, the method may also include associating network metadata (e.g., control-plane metadata) with the egress traffic configuration (e.g., configuration file) associated with the application orchestration system or application itself such that the egress traffic is sent to the remote service via the networking path. For instance, an application operator may associate the network metadata with the egress traffic configuration. In one example, associating the network metadata with the egress traffic configuration may include defining an annotation for an egress policy in the egress traffic configuration. In an additional, or alternative, example, if the network is an SD-WAN, one or more SD-WAN policies may be associated with the egress traffic configuration. As another additional, or alternative, example, the network metadata may be associated with the egress traffic configuration by storing an indication in a configuration file associated with the application or the application orchestration system, and the indication may be indicative of the networking path that is optimized for sending the egress traffic to the remote service. In some examples, to associate the network metadata with the egress traffic configuration, an application operator may explicitly indicate in the config file that, for instance, traffic optimizations should be applied. For instance, the egress traffic configuration may be modified to include an instruction of "egress-optimization: enabled," "egress-optimization: prioritize," etc. In some examples, the network metadata may be utilized to determine which egress configs should be passed to the controller and which should not. Additionally, or alternatively, the network metadata may be utilized to indicate extra context for the remote service and/or the app that might help the SD-WAN to select the most suitable optimized path.

The technologies disclosed herein enable several advantages in computer-related technology to be achieved. For example, the technologies described herein enable a network (e.g., a SD-WAN) to automatically consume egress traffic information from application orchestration systems (e.g., Kubernetes) and use the egress traffic information to configure traffic optimizations towards remote services. By configuring these traffic optimizations, egress traffic can be sent from application orchestration systems to these remote services via networking paths that are specifically tailored or selected to meet the demands of the traffic. In some instances, certain flows may be given more bandwidth, reduced latency, more throughput, or the like in order to meet optimization requirements. Additionally, in some instances, by providing the network with egress traffic configurations from an application orchestration system, the network may more efficiently allocate its resources. Other improvements in computer-related technology will be readily apparent to those having ordinary skill in the art.

This application also describes an application monitoring system/framework that may be configured to collect, utilize, and exchange state information (e.g., application state and network state), configuration information, and/or other information to make network optimizations for applications hosted on an application orchestration system. In some examples, the monitoring system/framework may be composed of several different modules/components. This monitoring system/framework could, in some examples, be instantiated inside a Network Orchestrator itself, could be an independent package that interacts with the Network Orchestrator via APIs, could be deployed inside an Application Orchestrator (with which might interact or interact with another application orchestrator), and/or the like. As will be discussed in even further detail below, an exemplary application monitoring system/framework may be composed of an application orchestrator discovery component/module, one or more application watch components/modules, and/or a network state propagation component/module.

In examples, the application orchestrator discovery component/module may be configured to collect information about application orchestration system(s) and provide access to the application information they contain. For instance, the discovery component/module may collect information automatically from application hosting sources (e.g., leveraging the access to application hosting resources available or provisioned in the Network Orchestrator) or it could be able to expose an interface for network operators to provide details about the application orchestrator(s). The application orchestrator discovery component may determine a presence of an application orchestration system, how to communicate with it, how to obtain application-related information from it, and the like.

The application monitoring system may also include one or more application watch components that monitor and collect information about different application configurations or states present in the Application Orchestrator (e.g., information about external services the applications communicate with, numbers of replicas of a given application, applications that are being exposed to receive incoming traffic, location of applications relative to network elements and/or users, security, etc.). The information collected by these watch components may be utilized to drive actions on the network orchestration system (e.g., external service information can drive SaaS optimization, number of replicas can serve to allocate bandwidth, ingress information can generate different network policies, etc.).

In some examples, one of the application watch components may include an egress traffic monitoring component. For instance, the egress traffic monitoring component may monitor and collect egress traffic configuration data relating to egress traffic flowing out of a cluster associated with the application and to an external endpoint (e.g., an external endpoint associated with a remote database, external API, external service, etc.). In some examples, another application watch component could be an ingress traffic monitoring component. The ingress traffic monitoring component may monitor and collect ingress traffic configuration data relating to ingress traffic flowing into a cluster associated with the application and from an external endpoint. Additionally, in some examples, another watch component may be an application replica monitoring component that is configured to monitor and collect information relating to a number of replicas of an application (e.g., replicated application pods).

The network state propagation component/modules may gather network state from the network orchestrator and make it available at the application orchestrator level. This network state could be related with the network action(s) taken as a consequence of the application watch components propagating application state/configuration to the network orchestrator. In some examples, it could also be network state relevant to the different application configuration/state collected by the application watch component(s). In some examples, the network state exposed at the application orchestrator could be represented by its own configuration/state objects in the application orchestrator, or could be attached to existing configuration/state in the app orchestrator (particularly when the existing application configuration/state is being fetched by the different application watch components).

In some examples, the network orchestrator may make various network optimizations based on the application state, configurations, and other information obtained from the application monitoring system. For instance, if the application monitoring system reports an increase or decrease in a number of application replicas, then the network orchestrator may adjust network flows accordingly (e.g., increase/decrease bandwidth, throughput, latency, etc.). As another example, the network orchestrator may create, revise, or enforce various networking policies based on application traffic configurations, create application-specific flows, or the like.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may implement various aspects of the technologies described herein. The architecture 100 may include a network 102 that is disposed between an application orchestration system 108 and one or more remote service(s) 114(1)-114(N) (where N can represent any number). In some examples, a controller 104 of the network 102 may receive egress traffic information 106 associated with the application orchestration system 108. The egress traffic information 106 may, in some examples, comprise data indicating an egress traffic definition associated with egress traffic 110 of one or more application(s) 112(1)-112(N) of the application orchestration system 108. In some examples, the egress traffic 110 may be flowing from the application orchestration system 108 and/or the one or more application(s) 112 to the one or more remote service(s) 114(1)-114(N).

In examples, the network 102 may be a software-defined wide area network (SD-WAN). Although many of the examples described herein are with respect to SD-WAN, other types of network configurations are possible in addition to, or alternatively to, an SD-WAN. For instance, the network 102 may also include a multiprotocol label switching (MPLS) network, a 4G or 5G network, a broadband internet network, a dedicated internet network, or any computer network. In some examples, the network 102 may be associated with one or more edge nodes, such as the edge nodes 116(1), 116(2), and 116(3) that serve different enterprise sites 124. For instance, the edge node 116(1) may be an edge device of the enterprise site 124(1), the edge node 116(2) may be an edge device of the enterprise site 124(2) (e.g., which may be an enterprise data center), and the edge node 116(3) may be an edge device of the enterprise site 124(3) (e.g., which may be an enterprise colocation facility).

In examples, the controller 104 may be a software-defined networking (SDN) controller that monitors, probes, establishes, etc. flows over the network 102. In some instances, the controller 104 may be an application in the network 102 architecture that manages flow control for improved network management and application performance. In some examples, the controller 104 may run on a server and use protocols to tell switches or routers of the network 102 (e.g., the edge nodes 116(1)-116(3) or other devices of the network fabric) where to send packets (e.g., the egress traffic 110). In some examples, the controller 104 may direct traffic according to one or more forwarding policies defined by a network operator, thereby minimizing manual configurations for individual network devices, such as the edge nodes 116(1)-116(3) or other devices of the network 102 fabric.

In some instances, the controller 104 may establish different networking paths, such as the networking paths 118(1), 118(2), and 118(3), from the application orchestration system 108 to the remote service(s) 114 that an application 112, or the application orchestration system 108 itself, is consuming. Additionally, in some examples, the edge nodes 116 may probe the different networking path(s) 118 over time and send this information to the controller 104 to determine which specific path may be the best way for an application 112 (or the orchestration system, generally) to reach the remote service(s) 114. Additionally, in some instances, the controller 104 may dynamically select specific networking path(s) 118 to send the application egress traffic 110 to the remote service(s) 114.

In examples, the controller 104 may receive egress traffic information 106 from the application orchestration system 108. In some examples, the egress traffic information 106 may be associated with the individual application(s) 112 hosted on the application orchestration system 108 (e.g., specific egress policies for specific applications), or may be associated with the application orchestration system 108 itself (e.g., a global egress policy for the application orchestration system 108). In some examples, the egress traffic information may include an egress traffic definition associated with the egress traffic 110 of the application(s) 112 and/or the application orchestration system 108. In some examples, the egress traffic definition may be stored in an egress configuration (e.g., configuration file) associated with the application orchestration system 108 or an application 112 (e.g., namespace). The egress traffic definition may include, in some instances, a destination internet protocol (IP) address associated with one of the remote services 114, a destination port associated with one of the remote services 114, a network 5-tuple associated with the egress traffic 110, a hostname or domain name associated with the remote services 114, and/or the like.

In some examples, the egress traffic information 106 may be used by the controller 104 to determine an optimal networking path 118 to send the egress traffic 110 to the remote service(s) 114. For example, using egress traffic information 106 (e.g., egress traffic definition or configuration) associated with a specific application 112, the controller 104 may determine which specific remote service 114 that the specific application 112 is sending its egress traffic 110 to, and based on its probing and knowledge of the available networking path(s) 118, the controller 104 may select a best or most optimal networking path 118 for steering the egress traffic 110 or, in some cases, may establish a new networking path 118 for the egress traffic 110 if an optimal path doesn't exist. In some instances, whether a networking path 118 is optimal can depend on the egress traffic 110 requirements of an application, such as whether the egress traffic 110 needs a high throughput flow, a low latency flow, a high bandwidth flow, or the like. In some examples, the networking path 118 that is optimized for sending the egress traffic 110 to the specific remote service 114 may be a networking path that traverses through a fabric of the network 102, such as the networking path 118(1) that flows through the network 102 from the edge node 116(1) to the edge node 116(2) or the networking path 118(2) that flows through the network 102 from the edge node 116(1) to the edge node 116(3). In another example, the optimal networking path may be a direct internet access path, such as the networking path 118(3) that bypasses the fabric of the network 102 and goes directly to the remote service(s) 114.

In examples, how the controller 104 receives the egress traffic information 106 associated with the egress traffic 110 may vary depending upon implementation. In some examples, the controller 104 may establish a direct connection 120 with the application orchestration system 108. Via the direct connection 120, the controller 104 may obtain the egress traffic information 106 on demand from the application orchestration system 108. Additionally, or alternatively, in some examples, an agent 122 may be running on the application orchestration system 108, and the agent 122 may be configured to monitor and/or retrieve egress traffic information 106 data on behalf of the controller 104, as well as configured to forward the egress traffic information 106 to the controller 104. As just an example, if a new egress traffic configuration is detected by the agent 122 (e.g., a new application 112 is spun up), if a change in an egress traffic configuration is detected by the agent 122, or in other cases, the agent 122 may forward the egress traffic information 106 associated with that egress traffic configuration to the controller 104.

In some examples, an operator 128 associated with the application orchestration system 108 and/or on of the applications 112 may associated network metadata 126 with an egress traffic configuration associated with an application 112. In some examples, the network metadata 126 may indicate or prioritize which egress data flows are to be consumed by the network 102 and/or the controller 104 to determine optimal networking paths. Additionally, or alternatively, the network metadata 126 may be used by the controller 104 and/or the network 102 to determine which networking path to use for sending the egress flows. In one example, associating the network metadata 126 with the egress traffic configuration may include defining, by the operator 128, an annotation for an egress policy (e.g., security policy) in the egress traffic configuration. In an additional, or alternative, example, if the network 102 includes an SD-WAN, the operator 128 may associate one or more SD-WAN policies (e.g., security policies) with the egress traffic configuration. As another additional, or alternative, example, the operator 128 may associate the network metadata 126 with the egress traffic configuration by storing an indication in a configuration file associated with the application 112 or the application orchestration system 108, and the indication may be indicative of the specific networking path 118 that is optimized for sending the egress traffic 110 to the specific remote service 114. In some examples, the network metadata 126 may indicate egress traffic requirements of an application, such as whether the egress traffic needs a high throughput flow, a low latency flow, a high bandwidth flow, or the like.

In some examples, the application orchestration system 108 may be any type of application orchestration system or container orchestration platform (e.g., Kubernetes, Docker Swarm, Apache Mesos, etc.) that is capable of explicitly defining configuration for application egress traffic 110. In some examples, this defined configuration may be a part of the general configuration of the application orchestration system 108 itself (e.g., part of some network policies in Kubernetes), can be an ad-hoc configuration in place to handle the egress traffic 110 (e.g., in-house solutions), can be part of a component running on the application orchestration system 108 that is capable of handling the egress traffic 110 (e.g., a service mesh where explicit egress policies can be defined), and/or the like. In some examples, the application orchestration system 108 infrastructure may be running at the enterprise site 124(1), a cloud-based data center, an enterprise data center, or the like.

In examples, the remote service(s) 114 may be any type of remote service or application that is being utilized by the one or more application(s) 112 and/or the application orchestration system 108. For examples, the remote service(s) 114 may include, among other things, software as a service (SaaS) workloads, application programming interface (API) services, remote storage or database solutions (e.g., key-value stores), middleware services, monolithic services, or the like.

Figure 2:
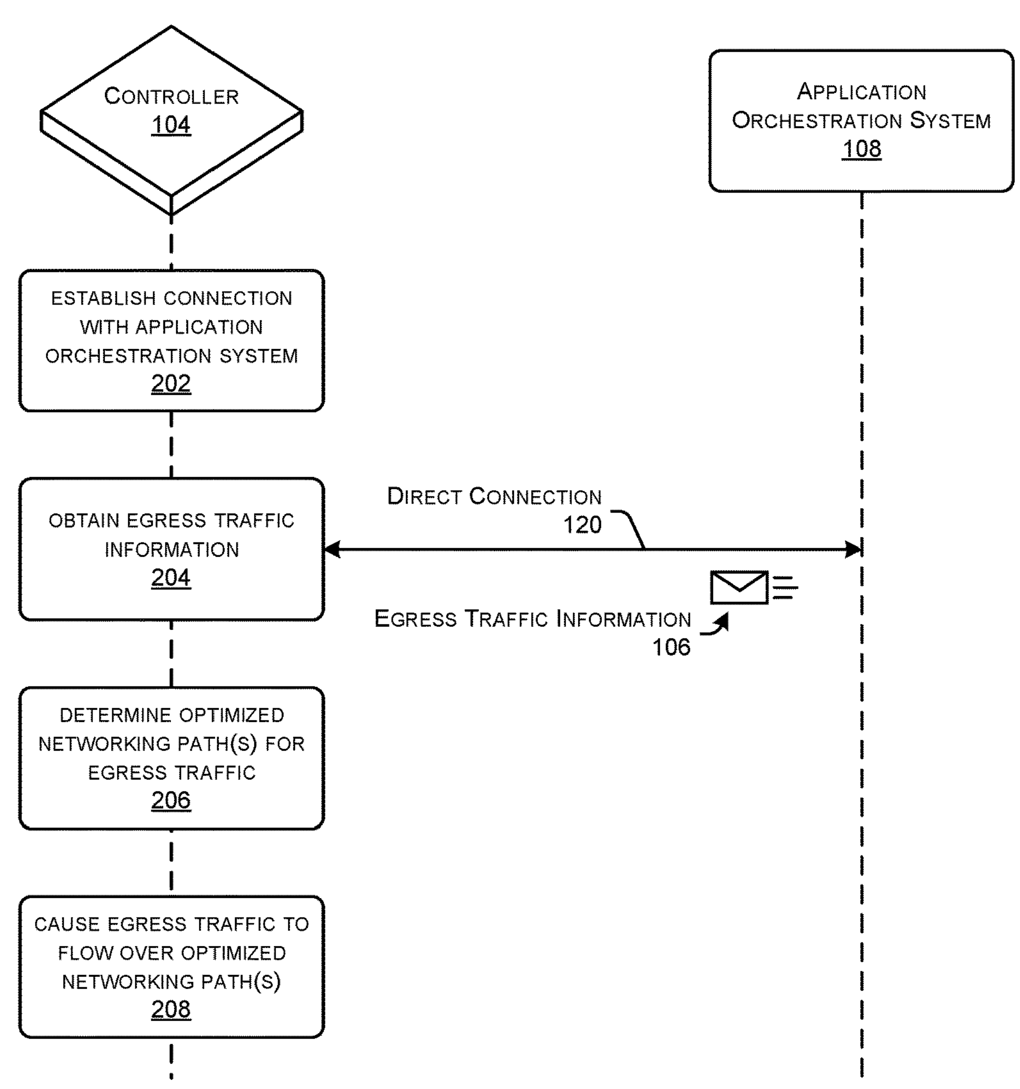
FIG. 2 is a data flow diagram illustrating example operations that may be performed be respective entities to implement some of the aspects of the techniques described herein.

FIG. 2 is a data flow diagram illustrating example operations 200 that may be performed be respective entities to implement some of the aspects of the techniques described herein. For instance, the operations 200 may be performed by the controller 104 and/or the application orchestration system 108.

At operation 202, the controller 104 may establish a direct connection 120 with the application orchestration system 108. The direct connection 120 may allow the controller 104 to monitor, obtain, create, modify, etc. egress traffic configurations associated with applications hosted on the application orchestration system 108.

At operation 204, the controller 104 may obtain, using the direct connection 120, egress traffic information 106 from the application orchestration system 108. In some examples, the egress traffic information 106 may be data indicating an egress traffic configuration associated with an application that is running on the application orchestration system 108. In some examples, the egress traffic configuration may indicate a networking policy associated with egress traffic of the application. Additionally, or alternatively, the egress traffic information 106 may be data indicating an egress traffic definition associated with egress traffic of an application that is running on the application orchestration system 108. In some examples, the egress traffic definition may include, among other things, a destination IP address associated with a remote service to which the application is exporting the egress traffic, a destination port associated with the remote service, a networking protocol associated with the egress traffic, an indication of whether or not the egress traffic is encrypted, a hostname associated with the remote service, a URL associated with the remote service, and/or the like.

At operation 206, the controller 104 may determine one or more optimized networking path(s) for the egress traffic. In some examples, the controller 104 may determine the one or more optimized networking path(s) for the egress traffic based at least in part on the egress traffic information 106. For instance, the controller 104 may have knowledge of various different networking paths it has established between the application orchestration system 108 and the remote service(s) that an application is consuming. Additionally, in some examples, the controller 104 may be able to monitor and/or probe the different networking path(s) over time to determine which specific path may be the best way to send the egress traffic to the remote service(s). Additionally, in some instances, the controller 104 may dynamically select a specific networking path to send the application egress traffic to the remote service(s).

At operation 208, the controller 104 may cause the egress traffic to flow over the optimized networking path(s). For instance, the controller 104 may program the edge node 116(1) to send the egress traffic over the optimized networking path(s), whether that be over the network, a direct internet access flow, through a firewall, or the like.

Figure 3:
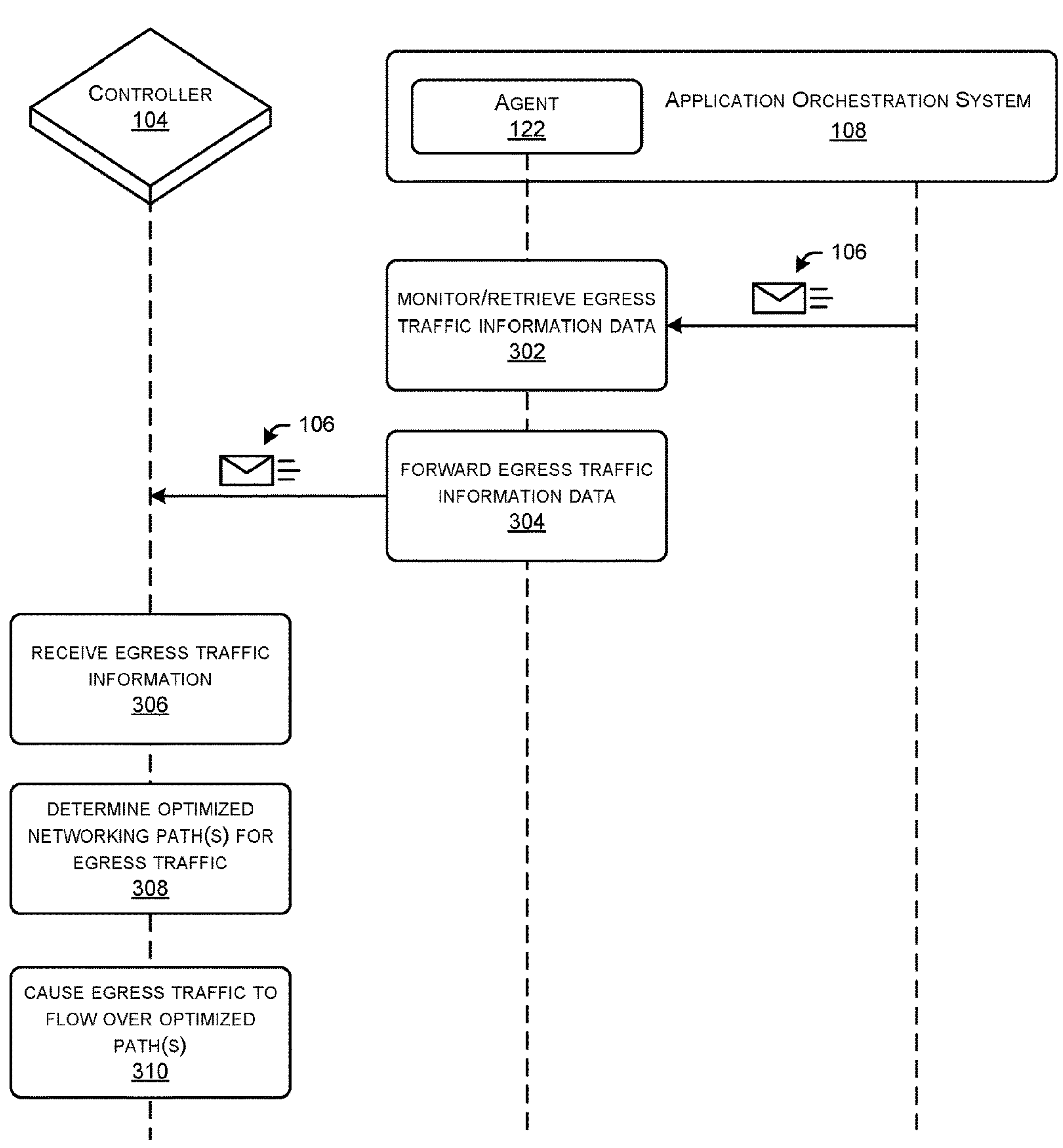
FIG. 3 is a data flow diagram illustrating other example operations that may be performed by respective entities to implement some of the aspects of the techniques described herein.

FIG. 3 is a data flow diagram illustrating other example operations 300 that may be performed by respective entities to implement some of the aspects of the techniques described herein. For instance, the operations 300 may be performed by the controller 104, the agent 122, and/or the application orchestration system 108.

At operation 302, the agent 122 may monitor and/or retrieve egress traffic information 106 associated with egress traffic of an application that is running on the application orchestration system 108. In examples, the egress traffic may be sent to a remote service by the application.

At operation 304, the agent 122 may forward the egress traffic information 106 to the controller 104. In some examples, the agent 122 may forward the egress traffic information 106 based at least in part on receiving a request form the controller 104 to provide the egress traffic information 106, based at least in part on the agent 122 detecting a change with respect to an egress traffic configuration and/or definition associated with the application, based at least in part on detecting that a new application has been launched on the application orchestration system 108 wherein the new application has egress traffic to a remote service, and/or the like. In some examples, the egress traffic information 106 may be data indicating an egress traffic configuration associated with the application that is running on the application orchestration system 108. In some examples, the egress traffic configuration may indicate a networking policy associated with egress traffic of the application. Additionally, or alternatively, the egress traffic information 106 may be data indicating an egress traffic definition associated with egress traffic of an application that is running on the application orchestration system 108. In some examples, the egress traffic definition may include, among other things, a destination IP address associated with a remote service to which the application is exporting the egress traffic, a destination port associated with the remote service, a hostname associated with the remote service, a URL associated with the remote service, a networking protocol associated with the egress traffic, an indication of whether or not the egress traffic is encrypted, and/or the like.

At operation 306, the controller 104 may receive the egress traffic information 106 from the agent 122. At operation 308, the controller 104 may determine one or more optimized networking path(s) for the egress traffic. In some examples, the controller 104 may determine the one or more optimized networking path(s) for the egress traffic based at least in part on the egress traffic information 106. For instance, the controller 104 may have knowledge of various different networking paths it has established between the application orchestration system 108 and the remote service (s) that an application is consuming. Additionally, in some examples, the controller 104 may be able to monitor and/or probe the different networking path(s) over time to determine which specific path may be the best way to send the egress traffic to the remote service(s). Additionally, in some instances, the controller 104 may dynamically select a specific networking path to send the application egress traffic to the remote service(s).

At operation 310, the controller 104 may cause the egress traffic to flow over the optimized networking path(s). For instance, the controller 104 may program the edge node 116(1) to send the egress traffic over the optimized networking path(s), whether that be over the network, a direct internet access flow, through a firewall, or the like.

Figure 4:
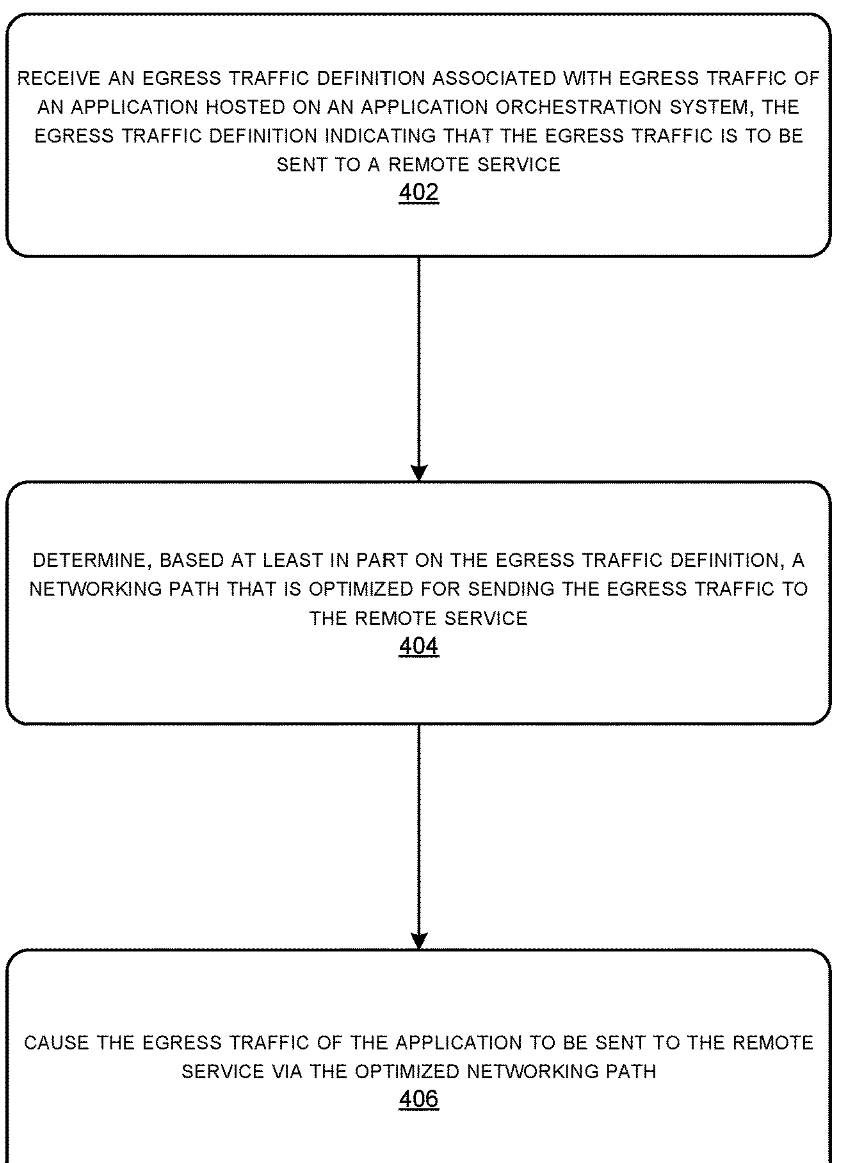
FIG. 4 is a flow diagram illustrating an example method associated with automating traffic optimizations for egress traffic of an application orchestration system that is being sent over a network to a remote service.

FIG. 4 is a flow diagram illustrating an example method 400 associated with automating traffic optimizations for egress traffic of an application orchestration system that is being sent over a network to a remote service. The logical operations described herein with respect to FIG. 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 400 begins at operation 402, which includes receiving an egress traffic definition associated with egress traffic of an application hosted on an orchestration system, the egress traffic definition indicating that the egress traffic is to be sent to a remote service. For instance, the controller 104 of the network 102 may receive the egress traffic information 106 (which may include the egress traffic definition) associated with the egress traffic 110 of the application orchestration system 108. In some examples, the egress traffic 110 be sent to one or more remote service(s) 114. In some examples, the egress traffic information 106 may be specific egress information associated with a specific application 112 that is running on the application orchestration system 108.

In some examples, how the egress traffic definition is received by the controller may vary from case to case based on specific implementations. For instance, as one example, the egress traffic definition may be received from an agent that is running on resources of the application orchestration system. In examples, the agent may be configured to monitor and/or retrieve egress traffic definition data on behalf of the controller, as well as configured to forward the egress traffic definition(s) on to the controller. As an additional, or alternative, example, the egress traffic definition(s) may be received by the controller via a direct connection with the application orchestration system. For instance, the controller may establish a direct connection with the application orchestration system and obtain, via the direct connection, the egress traffic definition from the egress traffic configuration of the application orchestration system.

At operation 404, the method 400 includes determining, based at least in part on the egress traffic definition, a networking path that is optimized for sending the egress traffic to the remote service. For example, the controller 104 may determine, based at least in part on the egress traffic information 106, a networking path 118 that is optimized for sending the egress traffic 110 to the remote service 114. By way of example, and not limitation, the controller 104 may determine which specific remote service 114 that a specific application 112 is sending its egress traffic 110 to, and based on the controller's probing and/or knowledge of available networking path(s) 118, the controller 104 may select a best or most optimal networking path 118 for steering the egress traffic 110. Alternatively, in some cases, the controller 104 may establish a new networking path 118 for the egress traffic 110 if an optimal path doesn't exist.

In some instances, whether a networking path is optimal can depend on the egress traffic requirements of an application, such as whether the egress traffic needs a high throughput flow, a low latency flow, a high bandwidth flow, or the like. In some examples, the optimal networking path for sending the egress traffic to the specific remote service may be a networking path that traverses through a fabric of the network. In another example, the optimal networking path may be a direct internet access path that bypasses the fabric of the network and goes directly to the remote service.

At operation 406, the method 400 includes causing the egress traffic of the application to be sent to the remote service via the optimized networking path. For instance, the controller 104 may cause the egress traffic of the application to be sent to the remote service via the optimized networking path by programming one or more edge nodes 116 to send the egress traffic flows over those networking paths.

Figure 5:
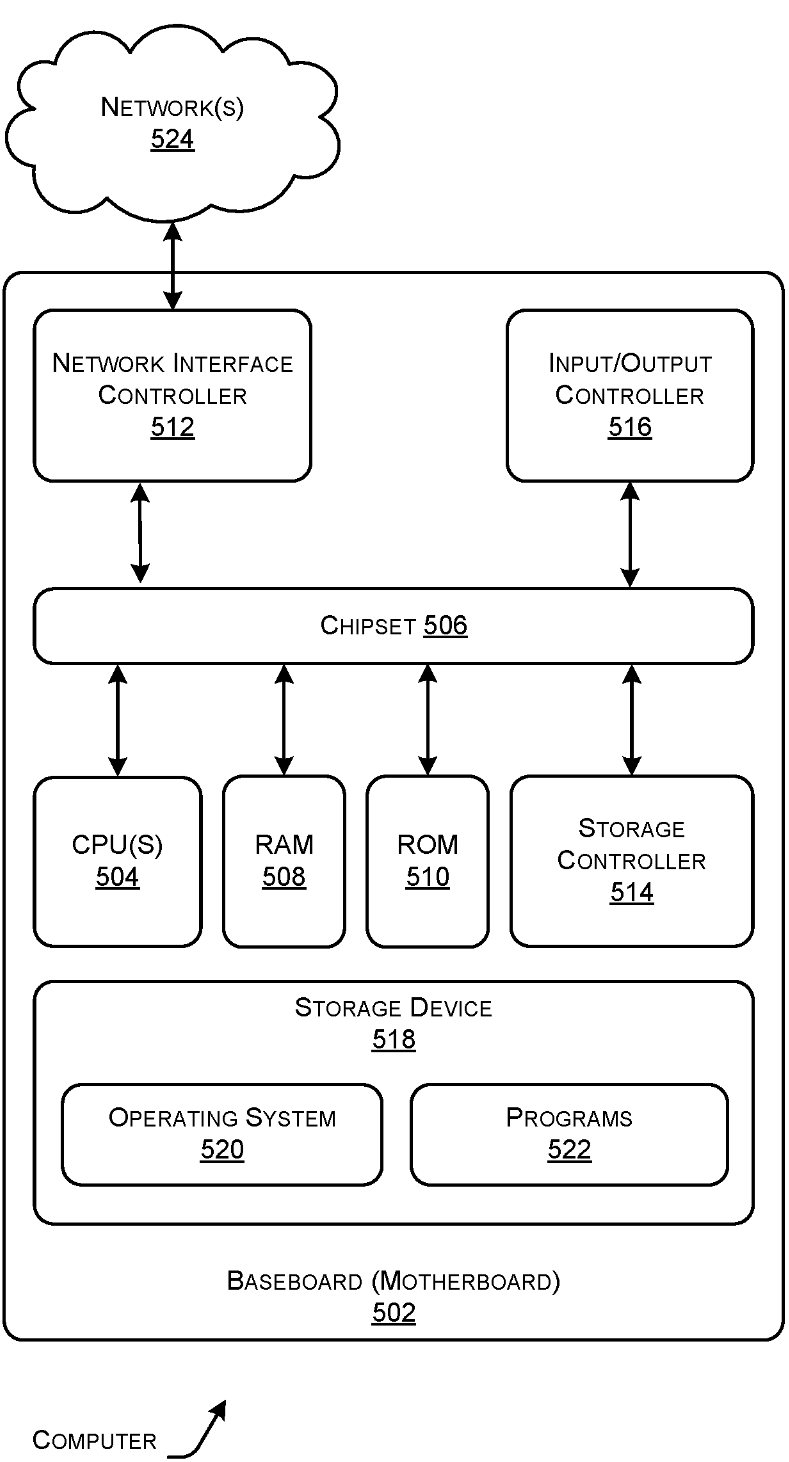
FIG. 5 is a computer architecture diagram showing an illustrative computer hardware architecture for implementing a computing device that can be utilized to implement aspects of the various technologies presented herein.

FIG. 5 is a computer architecture diagram showing an illustrative computer hardware architecture for implementing a computing device that can be utilized to implement aspects of the various technologies presented herein. The computer architecture shown in FIG. 5 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 102, the application orchestration system 108, or the like. The chipset 506 can include functionality for providing network connectivity through a NIC 512, such as a gigabit Ethernet adapter. The NIC 512 is capable of connecting the computer 500 to other computing devices over the network 524. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units.

The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the architecture 100 and or any components included therein, may be supported by one or more devices similar to computer 500. Stated otherwise, some or all of the operations performed by the architecture 100, and or any components included therein, may be performed by one or more computing devices, which may be similar to the computer 500, operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes and functionality described above with regard to FIGS. 1-4, and herein. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors (processors) configured to execute one or more stored instructions. The processor(s) may comprise one or more cores. Further, the computer 500 may include one or more network interfaces configured to provide communications between the computer 500 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for automating traffic optimizations for egress traffic of an application orchestration system that is being sent over a network to a remote service.

Figure 6:
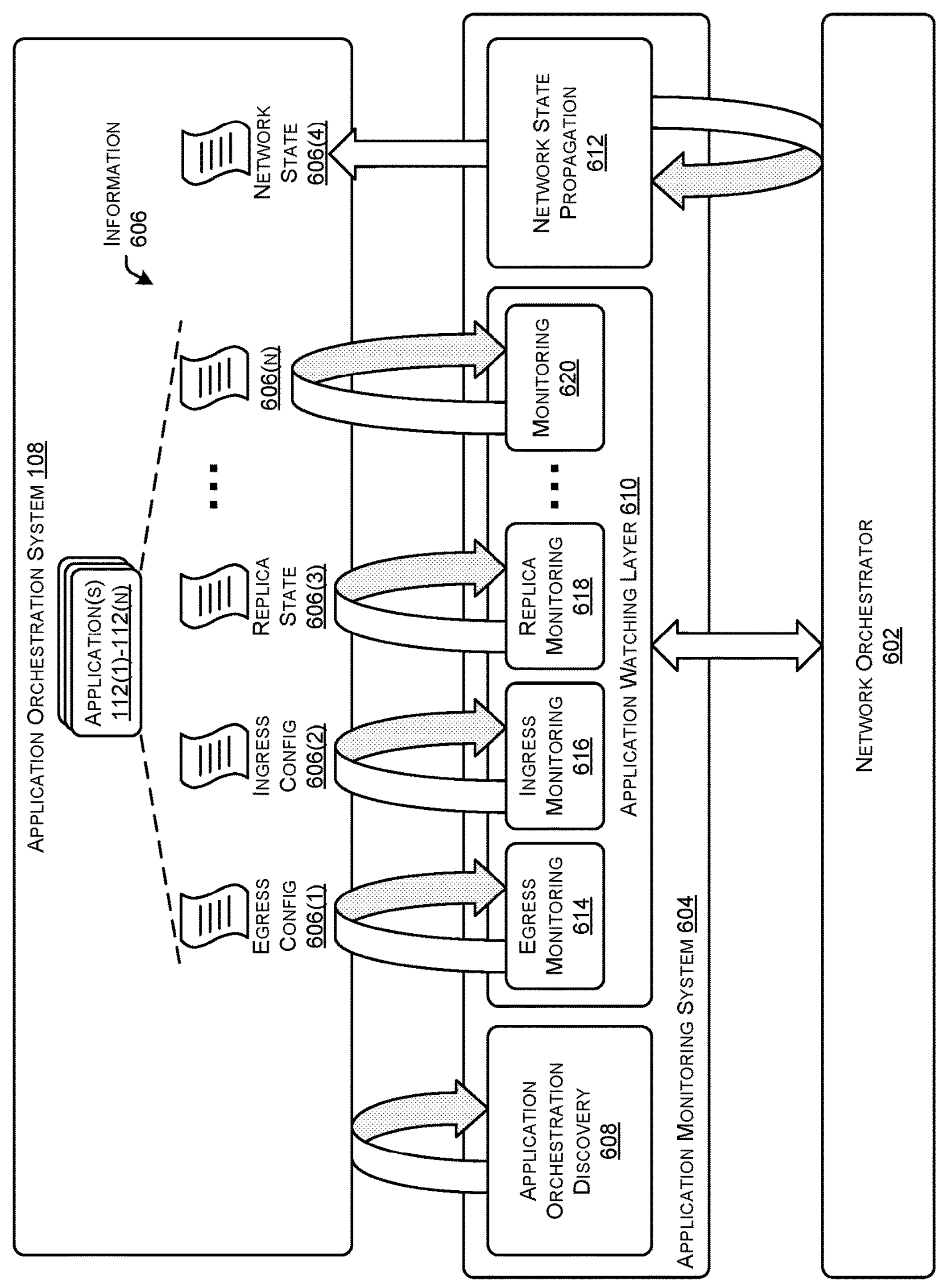
FIG. 6 is a system-level diagram illustrating an example architecture that may be utilized to collect, use, and exchange application state, network state, configurations, and other information for making network optimizations.

FIG. 6 is a system-level diagram illustrating an example architecture 600 that may be utilized to collect, use, and exchange application state, network state, configurations, and other information for making network optimizations. The architecture 600 includes an application orchestration system 108 orchestrating one or more application(s) 112(1)-112(N), a network orchestrator 602, and an application monitoring system 604.

In examples, the network orchestrator 602 may provide network connectivity to the application orchestration system 108 and/or the one or more applications 112 orchestrated. For instance, the network orchestrator 602 may provide network connectivity for traffic associated with the applications 112, including, but not limited to, ingress traffic, egress traffic, and/or the like.

This application monitoring system 604 may be configured to collect, utilize, and exchange information 606 associated with an application, such as egress configuration information 606(1), ingress configuration information 606(2), replica state information 606(3), network state information 606(4), and/or other information 606(N) to enable the network orchestrator 602 to make network optimizations for the application(s) 112 orchestrated by the application orchestration system 108. In some examples, the application monitoring system 604 may be composed of several different modules/components. The application monitoring system 604 may interact with the network orchestrator 602, the application orchestration system 108, and/or the application(s) 112 via one or more API(s), in some examples. Although illustrated in FIG. 6 as an independent system, the application monitoring system 604 may be instantiated inside the network orchestrator 602 itself, could be deployed inside the application orchestration system 108 (with which might interact or which might interact with another application orchestrator), and/or the like. The application monitoring system 604 may be composed of an application orchestration discovery component 608 (also referred to herein as an "application orchestrator discovery component/module"), an application watching layer 610, which may include one or more application watch components/modules, and a network state propagation component 612.

In examples, the application orchestration discovery component 608 may be configured to collect information about application orchestration system(s), such as the application orchestration system 108, and provide access to the application information they contain. For instance, the application orchestration discovery component 608 may collect information automatically from cloud sources (e.g., leveraging the access to cloud resources available or provisioned in the network orchestrator 602) or it could be able to expose an interface for network operators to provide details about the application orchestration system 108. The application orchestration discovery component 608 may determine a presence of the application orchestration system 108, how to communicate with the application orchestration system 108, how to obtain application-related information from the application orchestration system 108, and the like.

The application watching layer 610 may include one or more application watch components that monitor and collect information about different application configurations or states present in the application orchestration system 108 (e.g., information about external services the applications communicate with, numbers of replicas of a given application, applications that are being exposed to receive incoming traffic, location of applications relative to network elements and/or users, security, etc.). The information collected by these watch components may be utilized by the network orchestrator to drive actions on the network (e.g., external service information can drive SaaS optimization, number of replicas can serve to allocate bandwidth, ingress information can generate different network policies, etc.). In examples, the application watching layer 610, or the individual components therein, may provide information collected from the orchestration system to the network orchestrator 602.

In some examples, the application watching layer 610 can include an egress monitoring component 614. For instance, the egress monitoring component 614 may monitor and collect egress configuration information 606(1) relating to egress traffic flowing out of application hosting infrastructure associated with an application and to an external endpoint (e.g., an external endpoint associated with a remote database, external API, external service, etc.).

In some examples, the application watching layer 610 can include an ingress monitoring component 616. The ingress monitoring component 616 may monitor and collect ingress configuration information 606(2) relating to ingress traffic flowing into application hosting infrastructure associated with the application and from an external endpoint.

Additionally, in some examples, the application watching layer 610 can include a replica monitoring component 618 that is configured to monitor and collect information relating to a number of replicas of an application (e.g., replicated application instances). For instance, the replica monitoring component 618 may retrieve the replica state information 606(3) from the application orchestration system 108. In examples, the application watching layer 610 can include a number of other monitoring components, such as the monitoring component 620, for retrieving addition information 606(N) from the orchestration system.

The network state propagation component 612 may gather network state information 606(4) from the network orchestrator 602 and make it available at the application orchestration system 108 level. This network state information 606(4) could be related to the network action(s) taken as a consequence of the application watching layer 610 propagating application state/configuration to the network orchestrator 602. In some examples, the network state information 606(4) could also be network information relevant to the different application configuration/state collected by the application watch component(s). In some examples, the network state information 606(4) exposed at the application orchestration system 108 level could be represented by its own configuration/state objects in the application orchestrator or could be attached to existing configuration/state in the application orchestrator (e.g., particularly when the existing application configuration/state is being fetched by the different application watch components).

Figure 7:
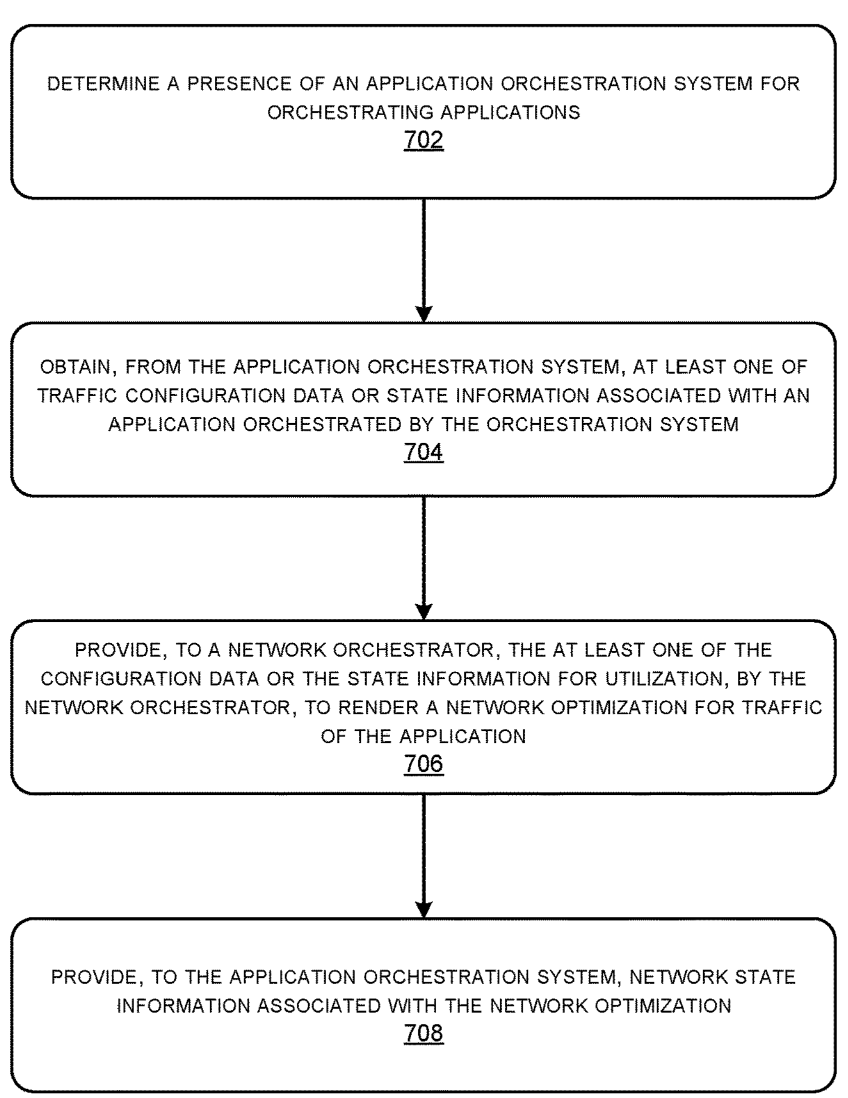
FIG. 7 is a flow diagram illustrating an example method associated with utilizing an application monitoring system to collect, use, and exchange application state, application configuration, and other information for making network optimizations.

FIG. 7 is a flow diagram illustrating an example method 700 associated with utilizing an application monitoring system to collect, use, and exchange application state, application configuration, and other information for making network optimizations. The logical operations described herein with respect to FIG. 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 700 begins at operation 702, which includes determining a presence of an orchestration system for orchestrating applications. For instance, the application orchestration discovery component 608 may determine the presence of the application orchestration system 108 orchestrating the application(s) 112.

At operation 704, the method 700 includes obtaining, from the application orchestration system, at least one of configuration data or state information associated with an application orchestrated by the orchestration system. For instance, the egress monitoring component 614 may obtain the egress configuration information 606(1), the ingress monitoring component 616 may obtain the ingress configuration information 606(2), the replica monitoring component 618 may obtain the replica state information 606(3), and/or the like.

At operation 706, the method 700 includes providing, to a network orchestrator, the at least one of the configuration data or the state information for utilization, by the network orchestrator, to render a network optimization for traffic of the application. For instance, the application monitoring system 604 and/or the application watching layer 610 or its respective components may provide the egress configuration information 606(1), the ingress configuration information 606(2), the replica state information 606(3), and/or the like to the network orchestrator 602 to be used by the network orchestrator in rendering a network optimization.

At operation 708, the method 700 includes providing, to the application orchestration system, network state information associated with the network optimization. For instance, the network state propagation component 612 may provide the network state information 606(4) to the application orchestration system 108.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by an application monitoring system associated with a network orchestrator, the method comprising:

determining a presence of an application orchestration system for orchestrating applications running as containers on a cluster of nodes;

obtaining, from the application orchestration system, configuration data associated with an application orchestrated by the orchestration system;

obtaining, from the application orchestration system, state information associated with the application;

providing, to the network orchestrator, the configuration data and the state information, the network orchestrator configured to render a network optimization for traffic of the application destined for the remote service external to the application orchestration system based on the configuration data and the state information, wherein the network optimization comprises establishing a plurality of networking paths between the application orchestration system and the remote service or dynamically selecting a specific networking path to steer the traffic toward the remote service; and providing, to the application orchestration system, network state information associated with the network optimization.

2. The method of claim 1, wherein the presence of the application orchestration system is determined by an application orchestrator discovery component of the application monitoring system, the application orchestrator discovery component further configured to:

determine how to connect to the orchestration system; and determine how to obtain application-related information from the orchestration system.

3. The method of claim 1, wherein the configuration data is egress traffic configuration data relating to egress traffic flowing out of application hosting infrastructure associated with the application and to an external endpoint.

4. The method of claim 1, wherein the configuration data is ingress traffic configuration data relating to ingress traffic flowing into application hosting infrastructure associated with the application and from an external endpoint.

5. The method of claim 1, wherein the state information associated with the application comprises replica state information indicative of a number of replicas of the application that are orchestrated by the orchestration system.

6. The method of claim 1, wherein the configuration data is obtained by a configuration monitoring component of the application monitoring system.

7. The method of claim 1, wherein the configuration data comprises egress traffic configuration data and ingress traffic configuration data associated with the application, the egress traffic configuration data obtained by an egress configuration monitoring component of the application monitoring system, the ingress traffic configuration data obtained by an ingress configuration monitoring component of the application monitoring system.

8. The method of claim 1, wherein the application monitoring system comprises:

an application orchestrator discovery component configured to determine the presence of the application orchestration system;

a plurality of application watch components configured to obtain, and provide to the network orchestrator, the configuration data and the state information; and a network state propagation component configured to provide the network state information to the application orchestration system.

9. An application monitoring system comprising:

a processor;

memory communicatively coupled to the processor;

an application orchestrator discovery component configured to determine a presence of an application orchestration system for orchestrating applications;

a first application watch component configured to:

obtain, from the application orchestration system, configuration data associated with an application orchestrated by the orchestration system, wherein the configuration data comprises an egress traffic definition specifying at least one of a destination address, destination port, hostname, or URL associated with a remote service external to the application orchestration system; and provide, to a network orchestrator, the configuration data, the configuration data to be utilized by the network orchestrator to render a network optimization for traffic of the application; and a network state propagation component configured to provide, to the application orchestration system, network state information associated with the network optimization.

10. The application monitoring system of claim 9, wherein the application orchestrator discovery component is further configured to:

determine how to connect to the application orchestration system; and determine how to obtain application-related information from the application orchestration system.

11. The application monitoring system of claim 9, wherein the configuration data is egress traffic configuration data relating to egress traffic flowing out of application hosting infrastructure associated with the application and to an external endpoint.

12. The application monitoring system of claim 9, wherein the configuration data is ingress traffic configuration data relating to ingress traffic flowing into application hosting infrastructure associated with the application and from an external endpoint.

13. The application monitoring system of claim 9, further comprising a second application watch component configured to:

obtain, from the application orchestration system, state information associated with the application; and provide, to the network orchestrator, the state information for rendering the network optimization for the traffic of the application.

14. The application monitoring system of claim 13, wherein the state information comprises replica state information indicative of a number of replicas associated with the application that are orchestrated by the orchestration system.

15. An application monitoring system comprising:

a processor;

memory communicatively coupled to the processor;

an orchestrator discovery component configured to determine a presence of an application orchestration system for orchestrating applications;

a first application watch component configured to:

obtain, from the application orchestration system, state information associated with an application orchestrated by the orchestration system; and provide the state information to a network orchestrator for utilization in rendering a network optimization for traffic of the application; and a network state propagation component configured to provide, to the application orchestration system, network state information associated with the network optimization, wherein the network optimization comprises establishing a plurality of networking paths between the application orchestration system and a remote service or dynamically selecting a specific networking path to steer the traffic toward the remote service.

16. The application monitoring system of claim 15, wherein the application orchestrator discovery component is further configured to:

determine how to connect to the application orchestration system; and determine how to obtain application-related information from the application orchestration system.

17. The application monitoring system of claim 15, further comprising a second application watch component configured to:

obtain, from the application orchestration system, configuration data associated with the application; and provide the configuration data to the network orchestrator for utilization in rendering the network optimization for the traffic of the application.

18. The application monitoring system of claim 17, wherein the configuration data is egress traffic configuration data relating to egress traffic flowing out of application hosting infrastructure associated with the application and to an external endpoint.

19. The application monitoring system of claim 17, wherein the configuration data is ingress traffic configuration data relating to ingress traffic flowing into application hosting infrastructure associated with the application and from an external endpoint.

20. The application monitoring system of claim 15, wherein the state information comprises replica state information indicative of a number of replicas associated with the application that are orchestrated by the orchestration system.

* * * * *